United States Patent Office 2,800,031
Patented July 23, 1957

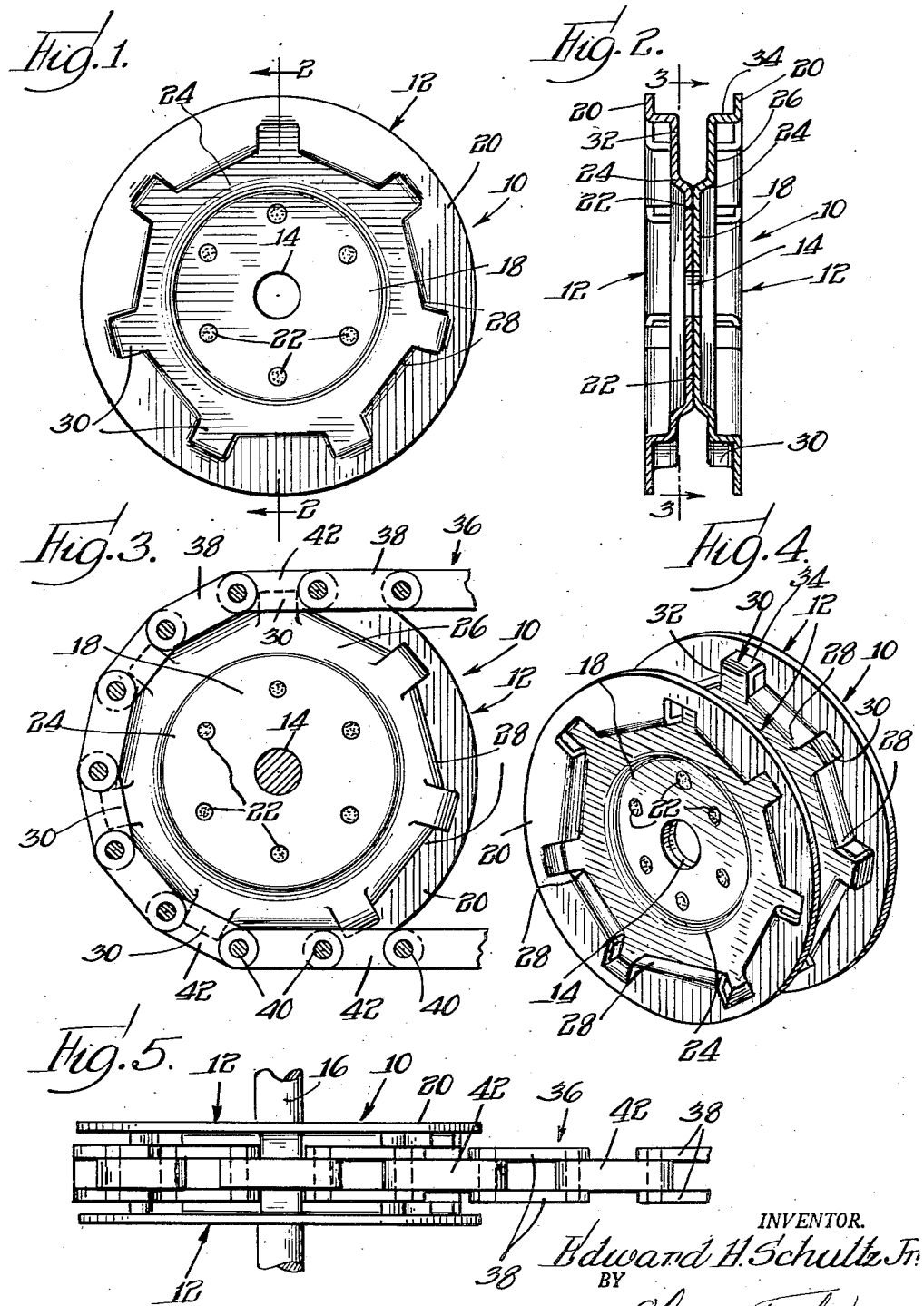

2,800,031

PULLEY

Edward H. Schultz, Jr., Chicago, Ill., assignor to The Nagel-Chase Manufacturing Company, Chicago, Ill., a corporation of Illinois Application March 10, 1954, Serial No. 415,308

5 Claims. (Cl. 74—243)

This invention is concerned generally with the transmission of rotary motion, and more particularly with a pulley for use with endless drive chains.

Pulleys or sheaves have been used widely for transmitting rotary power through the intermediary of various types of belts. When heavy loads are to be driven, or when rather close timing or synchronism is desired, common pulleys and belts which operate through friction are unsatisfactory. For such purposes, link belts or chains often are used. Cogs or sprocket teeth are caused to engage with links of the drive chain for positive driving rather than frictional driving and this insures proper timed relation and prevents slippage between pulleys and belts when heavy loads are encountered. Sprocket wheels and other rotary drive devices heretofore used with link belts or endless chains have been difficult or expensive to produce, or have had other defects which have kept them from being entirely satisfactory.

It is an object of this invention to provide a rotary drive device for use with link belts or chains which is more simply or economically fabricated than any heretofore known in the art.

It is a further object of this invention to provide a new or improved pulley for use with endless chains or link belts.

A further object of this invention is to provide a stamped pulley of sheet material, specifically sheet metal, for use with a link belt or chain.

A more specific object of this invention is to provide a sheet metal pulley punched to provide supporting ledges and positioning shoulders for the links of a link belt or chain.

Other and further objects and advantages of the present invention will be apparent from the following description when taken in connection with the accompanying drawing wherein:

Fig. 1 is an end or face view of a sheave or pulley produced in accordance with the principles of this invention;

Fig. 2 is a cross-sectional view thereof taken substantially along the line 2—2 in Fig. 1;

Fig. 3 is an axial sectional view of the pulley showing the cooperation of the link belt or chain therewith;

Fig. 4 is a perspective view of the pulley; and

Fig. 5 is a top or radial view of the pulley and chain.

Referring now in greater particularity to the drawings there will be seen a pulley embodying the principles of my invention and generally identified by the numeral 10. The pulley 10 comprises two plates or halves 12 forming mirror images of one another. Each plate or half 12 is generally circular in outline and is provided with a central hole 14 for mounting on a shaft 16 by any known or suitable means. The central portion 18 of each plate or half also is generally circular in outline and is planar in conformation, being offset from the plane of the corresponding outer portion 20. The central portions 18 of the mirror image halves abut one another and are suitably secured together by means such as spot welds 22.

Each plate or half 12 is obliquely offset from the central portion 18 as at 24, and the obliquely offset part joins an intermediate section 26 which is parallel to the central and outer portions 18 and 20 and substantially midway between them. The sheet material of each half or plate 12 extends substantially axially outwardly from the intermediate section 26 to the outermost section 20 in a plurality of ledges in the form of chordal link supporting shoulders or chordal surface portions 28. At the various places where the link supporting shoulders or chordal surface portions 28 would intersect one another, the sheet metal of the sides or halves 10 is punched out to provide link positioning shoulders 30 which are relatively short in length. Each of the positioning shoulders 30 comprises an angularly formed strap having a flange 32 forming a coplanar radial extension of the intermediate portion 26, and a right angularly disposed portion 34 connected to the outermost portion 20.

A sample link belt or chain 36 is shown in cooperative engagement with the pulley 10 in Figs. 3 and 5. This chain comprises alternate pairs of outside links 38 pinned together at their ends by pins 40 to single inside links 42. As now should be apparent, the pairs of outside links 38 rest on the link supporting shoulders 28 between the link positioning shoulders 30, while the inside links 42 lie in the spaces between the positioning shoulders 30. The cooperation of the links with the supporting and positioning shoulders insures perfect synchronism of the pulley and chain, and provides a positive driving action which cannot slip as is the case with common frictional pulleys and belts.

The pulley herein shown and described is simply and economically fabricated, being made of two identical sheet metal stampings welded or otherwise suitably secured together in mirror image relation. In some instances wherein synchronism is necessary, but large forces are not encountered, and particularly when quiet operation is desired, it is contemplated that sheet material other than metal might be utilized to fabricate the pulley. In any event, the links of the driving chain or link belt are accurately and positively positioned by the pulley for positive, and properly timed driving. The pulley easily can be used with conventional chains, although it is contemplated that special chains might be utilized, and the pulley configuration might vary somewhat properly to conform with such chains.

It will be understood that the specific example of the invention herein shown and described is for illustrative purposes only. Various structural changes are possible and form a part of the invention insofar as they fall within the spirit and scope of the appended claims.

I claim:

1. A pulley comprising a pair of similar sheet material sections each having a central portion, said central portions contacting one another and being welded together, the sheet material sections outwardly of said central portions being axially offset and having substantially chordal surface portions for supporting the links of a link chain or the like, flanges on the outer edges of said chordal surface portions extending radially outwardly therefrom for axially positioning said links on said chordal surface portions, and shoulders struck out of the flanges and chordal surface portions substantially at the junctions of adjacent chordal surface portions providing positioning and driving lugs for the links of said chain.

2. A pulley comprising a pair of similar sheet metal sections each having a central portion, said central portions contacting one another and being secured together, the sheet metal sections outwardly of said central portions having substantially chordal surface portions for supporting the links of a link chain or the like, flanges on the outer edges of said chordal surface portions extending radially outwardly therefrom for axially positioning said links on said chordal surface portions, and shoulders struck out of the flanges and chordal surface portions substantially at the junctions of adjacent chordal surface portions providing positioning and driving lugs for the links of said chain.

3. A pulley comprising a pair of sheet material sections held together in mirror image position and providing a central portion of double sheet thickness adapted to be rotatably mounted upon a supporting structure, axially and outwardly offset portions extending radially outwardly from said central portions and providing a space therebetween, peripherally disposed ledge portions positioned around the edge of each of said offset portions and extending axially outwardly therefrom, and projections extending radially outwardly from the ledge portions to position and drive chain links on the ledge portions.

4. A pulley as claimed in claim 3, wherein the ledge portions comprise chordal link supporting surfaces separated from one another by said projections.

5. A pulley as claimed in claim 4, wherein said projections are struck from at least the material of said ledge portions.

References Cited in the file of this patent

UNITED STATES PATENTS

| | | |
|---|---|---|
| 394,335 | Chase | Dec. 11, 1888 |
| 609,346 | Hewett | Aug. 16, 1898 |
| 839,325 | Scott | Dec. 25, 1906 |
| 1,412,068 | Stahl | Apr. 11, 1922 |
| 2,321,702 | Renkin | June 15, 1943 |
| 2,535,985 | Manney | Dec. 26, 1950 |